US006120047A

United States Patent [19]

Axelson et al.

[11] Patent Number: 6,120,047
[45] Date of Patent: Sep. 19, 2000

[54] LOW IMPACT HAND RIM APPARATUS FOR HAND-PROPELLED WHEELCHAIR

[75] Inventors: Peter W. Axelson; W. Mark Richter, both of Santa Cruz, Calif.

[73] Assignee: Beneficial Designs, Inc., Santa Cruz, Calif.

[21] Appl. No.: 09/240,101

[22] Filed: Jan. 29, 1999

Related U.S. Application Data

[60] Provisional application No. 60/108,388, Nov. 12, 1998.

[51] Int. Cl.$^{7}$ .................................................... B62M 1/14

[52] U.S. Cl. .................................... 280/250.1; 280/304.1

[58] Field of Search ............................ 280/250.1, 304.1, 280/249; 74/557, 548; 297/DIG. 10

[56] References Cited

U.S. PATENT DOCUMENTS

| | | | |
|---|---|---|---|
| 3,899,189 | 8/1975 | Watkins | 280/211 |
| 4,366,964 | 1/1983 | Farey et al. | 280/242 WC |
| 4,593,929 | 6/1986 | Williams | 280/650 |
| 5,160,156 | 11/1992 | Mendon | 280/250.1 |
| 5,306,035 | 4/1994 | Counts | 280/250.1 |
| 5,479,672 | 1/1996 | Brown et al. | 15/98 |
| 5,791,672 | 8/1998 | Masclet | 280/250.1 |
| 5,927,739 | 7/1999 | Evling | 280/250.1 |
| 5,988,661 | 11/1999 | Garfinkle | 280/250.1 |

FOREIGN PATENT DOCUMENTS

| | | | |
|---|---|---|---|
| 714306 | 8/1954 | United Kingdom | 280/250.1 |

*Primary Examiner*—J. J. Swann
*Assistant Examiner*—Michael Cuff
*Attorney, Agent, or Firm*—Carr & Ferrell LLP

[57] ABSTRACT

A hand rim assembly for a wheelchair wheel is disclosed, which includes an larger diameter hand rim and a smaller diameter hand rim. In one embodiment, the hand rim assembly is biasly coupled to the wheelchair wheel by a plurality of shock absorbing resilient fasteners. The shock absorbing resilient fasteners generally lessen the shock impact to the user's hands, arms, and shoulders, thus reducing the potential for repetitive stress injury and the like. In another embodiment, the smaller diameter hand rim has a different exterior coefficient of friction than that of the larger diameter rim so that users can use the hand rim with a higher coefficient of friction for propulsion and the rim with a lower coefficient of friction for braking. In addition, the rim used for braking, typically the smaller diameter rim, is formed of a thermally conductive material to reduce the potential for burning of the user's hands during braking.

20 Claims, 5 Drawing Sheets

LOW IMPACT HAND RIM APPARATUS FOR HAND-PROPELLED WHEELCHAIR

CROSS-REFERENCE TO RELATED APPLICATION

This is related to and claims the benefit of U.S. Provisional Application Ser. No. 60/108,388, filed Nov. 12, 1998 and entitled "LOW IMPACT HAND RIM APPARATUS FOR HAND-PROPELLED WHEELCHAIR."

GOVERNMENT RIGHTS

The invention was made with government support under SBIR Phase I Grant # 1 R43 HD36533-01 awarded by the National Center for Medical Rehabilitation in the National Institutes of Child Health and Human Development at the National Institutes of Health. The government has certain rights in the invention.

BACKGROUND OF THE INVENTION

1. Field of the Invention

The present invention relates generally to wheelchairs, and more particularly to an improved hand rim assembly for a hand-propelled wheelchair.

2. Description of the Background Art

The majority of hand-propelled wheelchairs in present use are equipped with a single tubular aluminum hand rim mounted offset from and towards the outside of each of two major wheels. Users generally maneuver these hand-propelled wheelchairs by gripping the hand rims and applying an appropriate torque. The torque applied to the hand rims by the user is then transmitted to the wheels via a rigid connection, thus resulting in rotational movement of the wheel and translational movement of the wheelchair. Once the wheelchair is in motion, the user may turn and brake the wheelchair by applying an appropriate level of grip force to the hand rim while maintaining a generally fixed arm position.

The single hand rim is typically rigidly attached to the wheelchair wheel using rigid machine screw fasteners between the wheel and the hand rim. Hand rim diameters are normally proportional to the size of wheel onto which the hand rim is mounted. Moreover, conventional hand rims commonly have a tubing diameter of about 0.75 inches. While generally suitable for propelling and maneuvering the wheelchair, conventional hand rims have some inherent disadvantages.

For example, the relatively small tubing diameter of a single hand rim provides a very small gripping surface for the user. As such, the pressure against the user's hands on the hand rims is relatively high as the user pushes down on the hand rim with sufficient force to propel or otherwise maneuver the wheelchair. For many users, this level of pressure against the hands may be uncomfortable or even painful.

The frictional characteristics of the surface coating of the single hand rim are limited by the need to avoid burning of the skin during braking and turning as well as the need to not abrade the user's hands. Conventional hand rims are normally formed of metallic materials, which typically have relatively high heat transfer characteristics, which tend to prevent the palms of the hands from being burned during braking. Such hand rims also tend to have relatively smooth exterior surfaces to prevent the user's hand from being abraded during braking and maneuvering by gripping the rim, which may or may not be rotating. Unfortunately, however, these smooth-surface metallic hand rims have low frictional characteristics. In order to compensate for the limited friction, users must apply a large grip force to facilitate propulsion, braking, or turning. For many wheelchair users, however, the application of a large grip force is uncomfortable, difficult, or functionally impossible.

The rigid connection between the hand rim and the wheel also tend to cause repetitive shock loading of the arms and hands of the user during propulsion. That is, as wheelchair users repeatedly push and release the hand rims, the associated repetitive loads on the hands, wrists, elbows, and shoulders can be significant. Indeed, the incidence of cumulative traumatic disorders, such as carpal tunnel syndrome and impingement syndrome of the shoulder, are currently estimated by some to be between about 30% to 50% of hand-propelled wheelchair users. These injuries may lead to a loss in the functional independence of many wheelchair users.

One proposed hand rim design, disclosed in U.S. Pat. No. 4,366,964, provides a single rim with an expanded grip surface. This enlarged single hand rim design, however, does not address the frictional disadvantages nor the reduction of repetitive shock loading during propulsion.

It is therefore the object of the present invention to provide an improved hand rim apparatus for use on hand-propelled wheelchairs, which effectively addresses the limitations of the currently available technology.

SUMMARY OF THE INVENTION

The present invention overcomes or substantially alleviates prior problems associated with conventional wheelchair hand rim designs. The apparatus generally provides the wheelchair user with an expanded grip surface as well as absorption of at least a portion of the repetitive shock loads imparted to the user during propulsion. The apparatus affects the wheelchair user during propulsion by reducing the required effort to grip and apply torque to the hand rim as well as by reducing long term damage to the upper extremity.

An expanded grip surface is achieved through the attachment of a second, smaller diameter hand rim offset laterally to the outside of a first, larger diameter hand rim. The lateral offset of the second hand rim is configured to optimize the cross sectional contour of the two rims such that it is ergonomically appropriate for the hand to grip the two rims simultaneously. The lateral offset may range from flush to several inches apart. Indeed, during propulsion, the wheelchair user grips across both hand rings, thus effectively distributing grip pressure.

Enhanced frictional characteristics of the inner, or larger diameter, rim are achieved by a higher frictional surface coating, such as vinyl or foam coating, on the larger diameter hand rim. During propulsion, the user grips across both hand rims, thus utilizing the high frictional characteristics of the larger diameter hand rim. During braking and turning, the user grips only onto the outer, or smaller, hand rim, which preferably is formed of a material having high heat transfer characteristics, thus allowing operation without burning of the skin. That is, the smaller diameter hand rim is formed of a thermally conductive material, such as aluminum, so that as the user grips the rotating smaller diameter hand rim to brake the wheelchair, the heat generated by the friction between the user's hand and the smaller diameter hand rim is quickly and effectively dissipated, thus reducing the burning of the user's hands during braking.

The reduction, or attenuation, of repetitive shock loads found during propulsion is achieved by connecting the larger diameter hand rim to the wheel with a plurality of resilient elastomeric fasteners, such as a vibration isolation shock mounts, as well as through the use of a foam surface coating on the larger diameter hand rim. During propulsion, as the user's hands impact the hand rim assembly, the hand rim assembly responds by first absorbing the initial shock (via the resilient fasteners, the foam coating, or both) and then by transferring the applied torque to the wheel.

In an alternate embodiment, the resilient elastomeric fasteners are used to connect a single low friction hand rim to the wheel. Another embodiment provides two offset hand rims with the larger diameter hand rim biasly connected to the wheel via a plurality of resilient fasteners and a smaller diameter rim rigidly coupled to the wheel. A yet additional embodiment includes larger diameter and smaller diameter rims rigidly connected to each other with the larger diameter rim rigidly connected to the wheel. Still another embodiment has an larger diameter rim rigidly connected to the wheel and a smaller diameter rim rigidly connected to the wheel.

Other advantages and features of the present invention will be apparent from the drawings and detailed description as set forth below.

DETAILED DESCRIPTION OF THE PREFERRED EMBODIMENT

Figure 1:
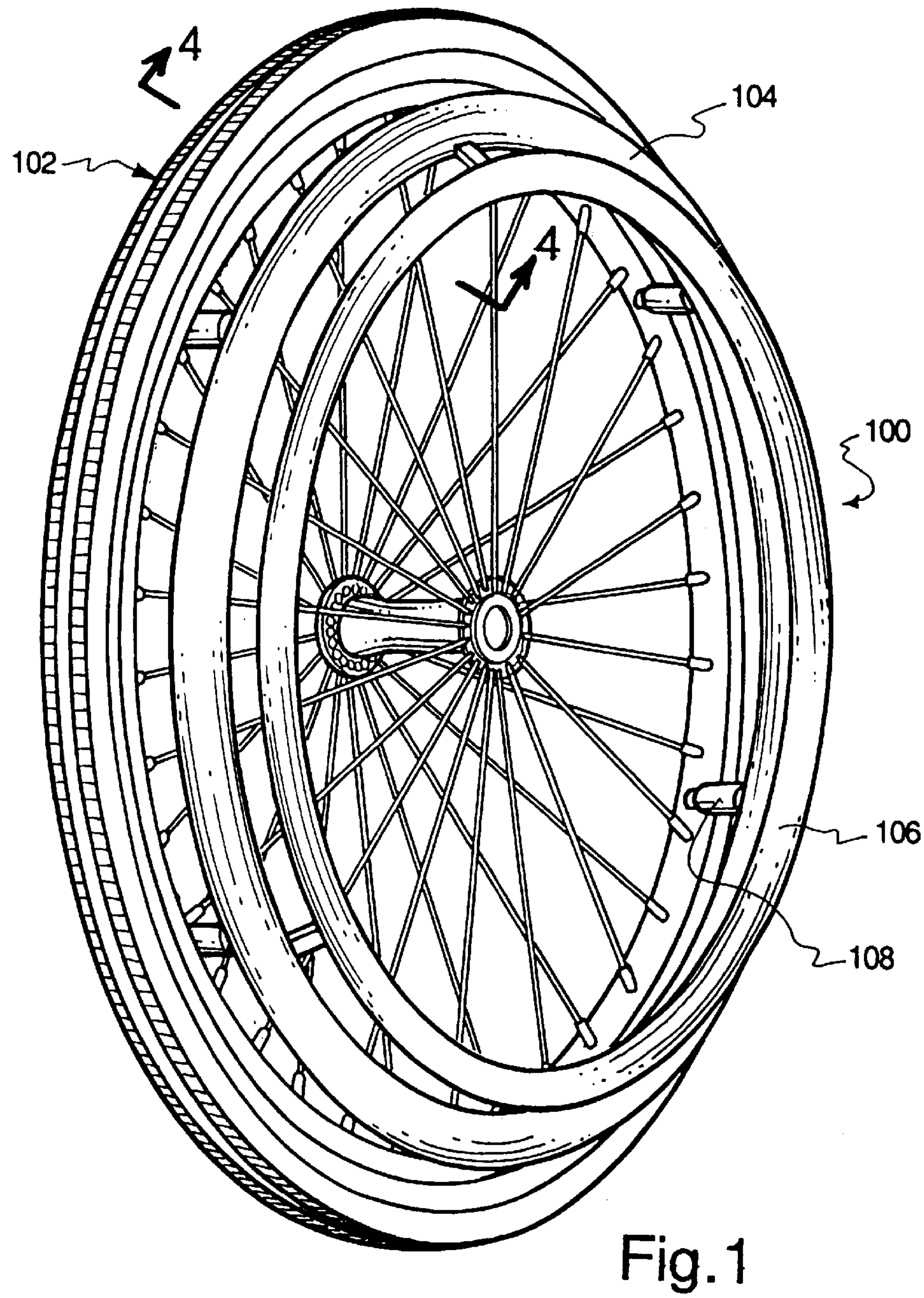
FIG. 1 is a perspective view of a low impact hand rim assembly mounted on a wheel for a manual wheelchair constructed in accordance with the present invention.

Referring to FIG. 1, a low impact hand rim assembly constructed in accordance with the present invention is generally designated 100. The assembly 100 is shown attached to a wheelchair wheel 102. The assembly 100 generally includes an larger diameter hand rim 104, a smaller diameter hand rim 106, and at least one resilient elastomeric fastener 108, which resiliently interconnects the hand rim 104 and the wheel 102. The wheelchair wheel 102 is oriented and mounted onto a wheelchair, in conventional fashion, such that the assembly 100 is opposite the wheelchair user. To propel the wheelchair, the user grips the assembly 100 and applies an appropriate torque. The torque applied to the assembly 100 is transmitted, via the elastomeric fasteners 108 to the wheel 102, resulting in the movement of the wheelchair. Advantageously, during braking and maneuvering, the user only grips on the smaller diameter hand rim 106, which may be formed of a material having good thermal conductivity, such as aluminum. During propulsion, however, the user preferably grips both rims 104 and 106.

While the hand rim 104 is shown as comprising a substantially circular cross-section, other cross-sectional geometries may also be employed. Similarly, the shape of the hand rim 104 may alternatively comprise a shape other than circular.

Figure 2:
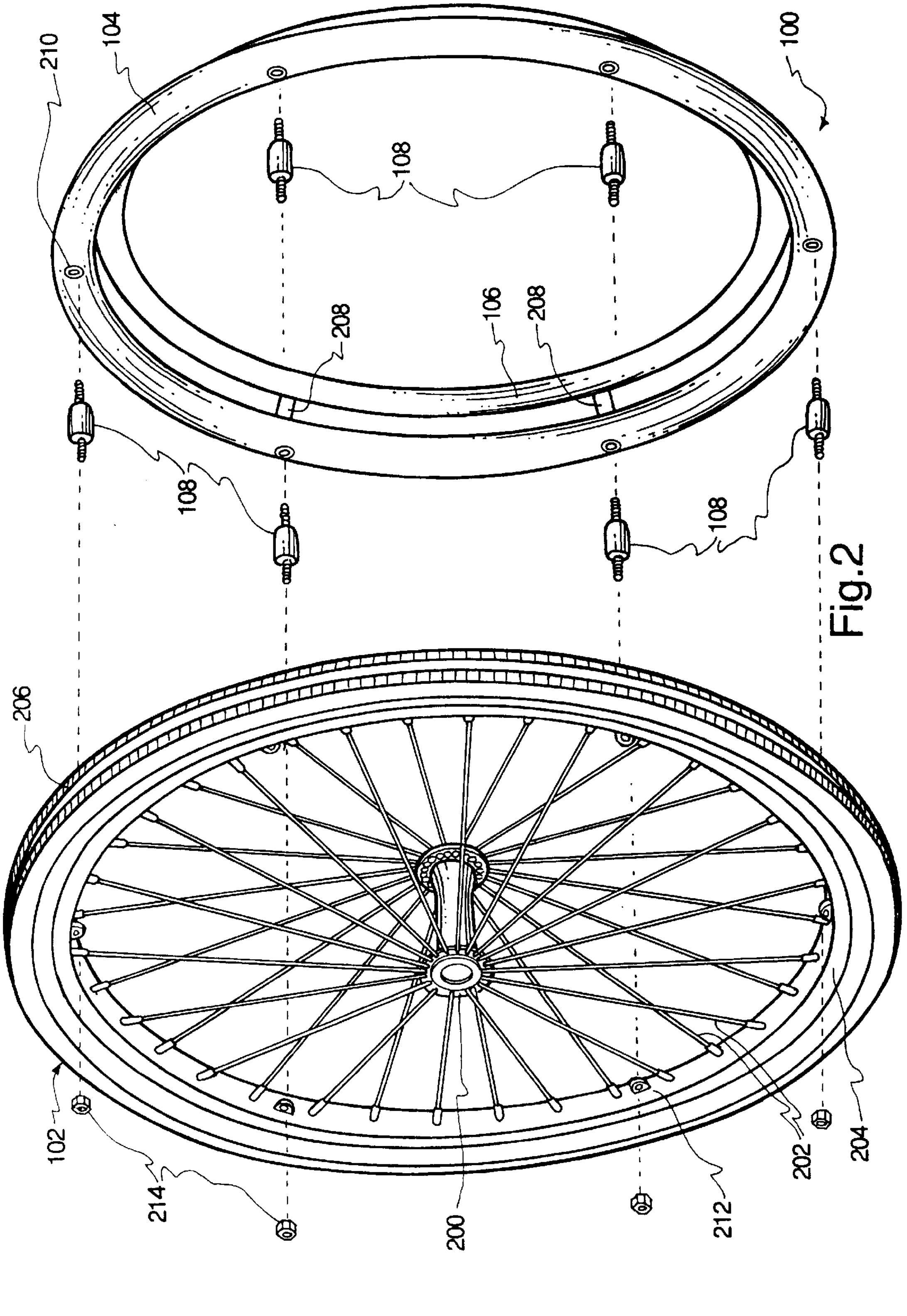
FIG. 2 is an exploded perspective view of the hand rim assembly of FIG. 1.

FIG. 2 shows an exploded assembly of the assembly 100 and wheel 102. The wheel 102, generally includes a hub 200, spokes 202, a wheel rim 204, a tire 206, and tab mounts 212. The tab mounts 212 are used for the connection of the hand rim assembly 100 to the wheel 102.

The hand rim assembly 100 is shown as generally including a smaller diameter hand rim 106 rigidly connected to an larger diameter hand rim 104 by a plurality of welded tabs 208. Threaded inserts 210 are mounted into the larger diameter hand rim 104 such that they are coaxial with the tab mounts 212 on the wheel 102 and on the opposite side of the tubing structure as the welded tabs 208. Elastomeric fasteners 108 are connected to the threaded inserts 210. The other end of the elastomeric fasteners 108 is inserted into a clearance hole in the tab mount 212. Nuts 214 are threaded onto the elastomeric fasteners 108 such that the apparatus 100 is effectively attached to the wheel 102.

Figure 3:
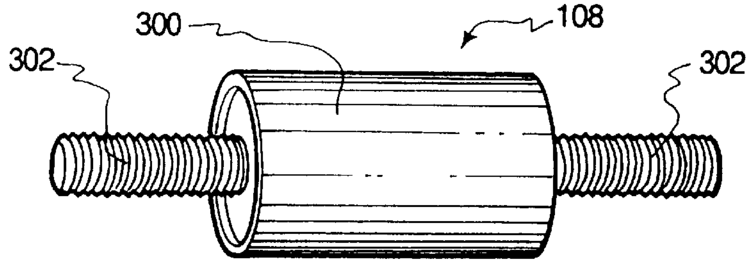
FIG. 3 is a perspective view of the elastomeric fastener device of FIG. 1.

FIG. 3 illustrates the resilient elastomeric fastener 108. As discussed above, the resilient elastomeric fastener 108 preferably comprises a vibration isolation shock mount having threaded extensions 302 and a resilient elastomeric section 300 disposed between the threaded extensions 302.

One role of the elastomeric fastener 108 is to provide an elastic or resilient coupling between at least a portion of the hand rim assembly 100 and the wheel 102. The elastomeric fastener 108 consists of three components, namely two threaded fasteners 302 and a molded rubber section 300 disposed between and interconnecting the fasteners 302. There are two threaded fasteners 302, one on each end of the molded rubber section 300. The threaded fasteners 302 are shaped much like a machine screw only the head of the screw is flat and of a larger diameter. The heads of the threaded fasteners 302 are adhered to or otherwise secured to the molded rubber section 300 during the molding process so that the fasteners comprise extensions from the molded rubber section 300. The size, shape, and durometer characteristics of the elastomeric fastener 108 are optimized to allow for an appropriate level of shock absorption for a variety of user groups. In a presently preferred embodiment, the resilient elastomeric section 300 is formed of rubber having a durometer of about 45.

Figure 4:
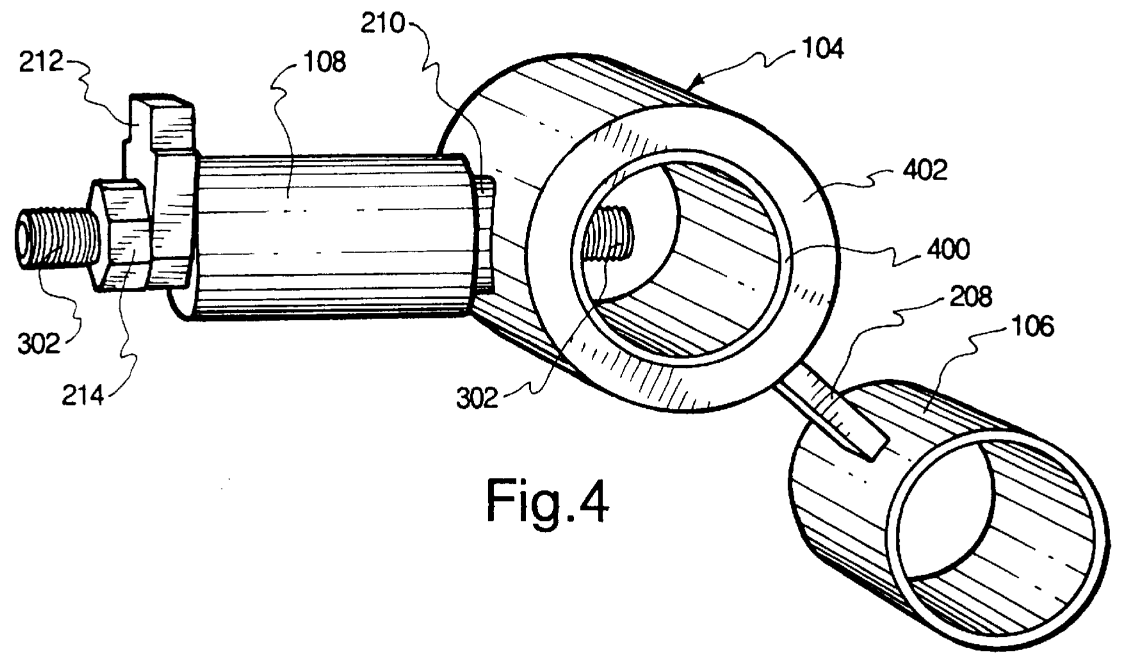
FIG. 4 is a perspective breakaway view of the apparatus of FIG. 1, taken along the line 4—4.

Referring to FIG. 4, a detailed breakaway view of the assembly of apparatus 100 and a tab mount 212 of wheel 102. This basic assembly is generally described above and is shown in FIG. 2. The welded tab 208 is oriented such that it aligns the centers of the tubing structures of the smaller diameter hand rim 104 and the larger diameter hand rim 106. The larger diameter hand rim 104 consists of a core aluminum tubing structure 400 encased in a foam coating 402. The foam coating 402 is provided to enhance both frictional and shock absorption characteristics. The smaller diameter hand rim 106 is a standard aluminum hand ring, which is advantageous for braking and turning due to its high heat transfer characteristics. The welded tab 208 is welded to the surface of the smaller diameter hand rim 106 and to the surface of the core aluminum tubing structure 400 of the larger diameter hand rim 104 prior to applying the foam coating 402. The residual length of the threaded fastener 302 after connection with the threaded insert 210 remains inside the core aluminum tubing structure 400 of the larger diameter hand rim 104.

Figure 5:
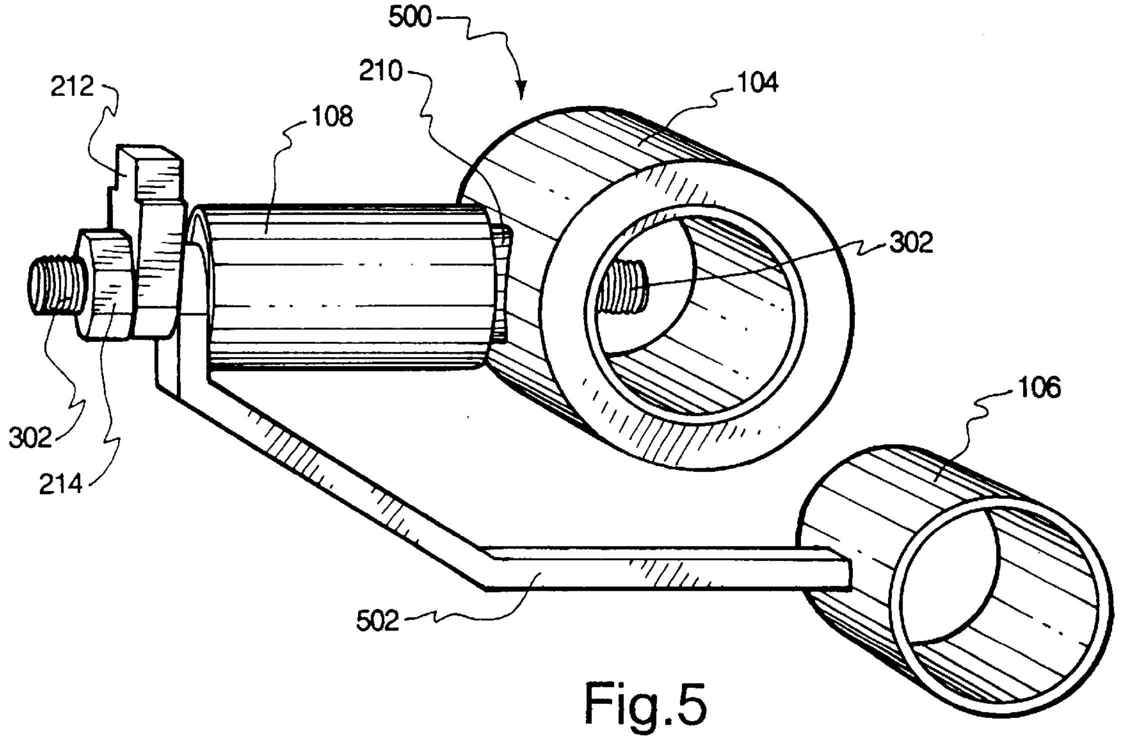
FIG. 5 is a perspective breakaway view of an alternate embodiment of a hand rim assembly constructed in accordance with the present invention.

Referring to FIG. 5, a detailed sectional view of the assembly of an alternate embodiment of apparatus 100 and a tab mount 212 of wheel 102 is generally indicated at 500. The embodiment 500 differs from the apparatus 100 in the method of connection between the smaller diameter hand rim 106 and the tab mount 212 of the wheel 102. The smaller diameter hand rim 106 connects to the tab mount 212 of the wheel 102 by means of an extended welded tab 502. One end of the extended welded tab 502 is welded to the surface of the smaller diameter hand rim 106. The other end of the extended welded tab 502 is constrained between the elastomeric fastener 108 and the tab mount 212 of the wheel 102 by means of a hole through which the threaded fastener 302 was inserted during assembly.

The assembly 500 permits the rim 104 to move relative to the rim 106 as a user grips the two rims. By permitting the two rims 104 and 106 to move relative to each other as the user grips them, a more comfortable grip is achieved. The advantages of the assembly 500 include the provision of shock absorption of repetitive grip loading during propulsion as well as providing enhanced responsiveness during braking and turning.

Figure 6:
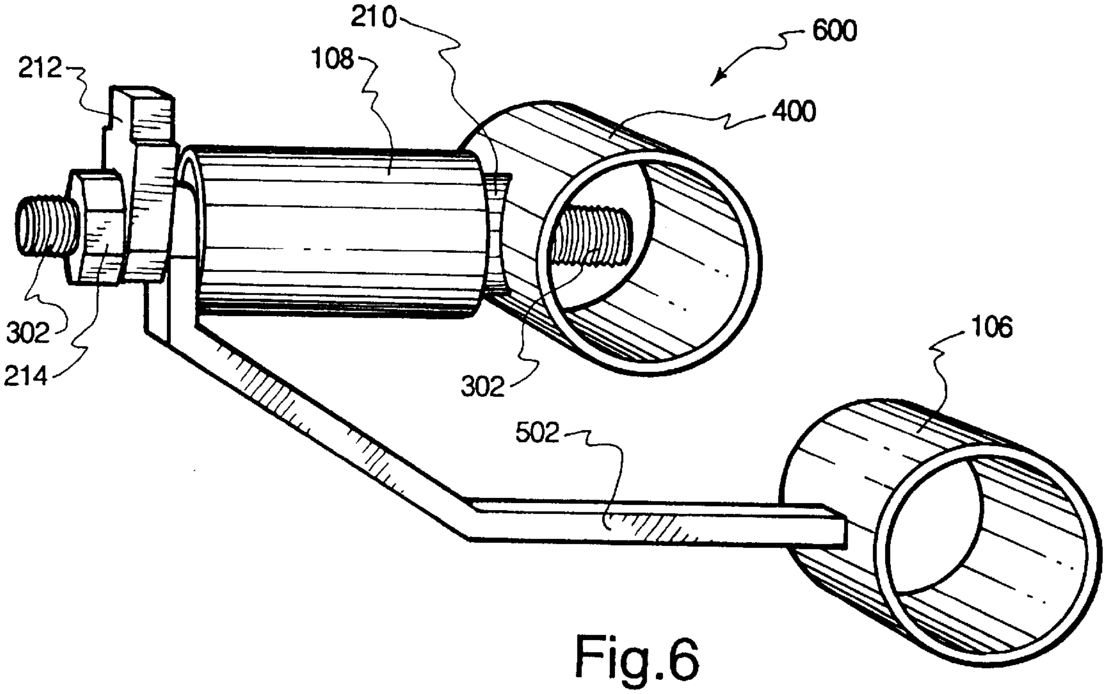
FIG. 6 is a perspective breakaway view of another embodiment of a hand rim assembly constructed in accordance with the present invention.

Referring to FIG. 6, a detailed sectional view of the assembly of an alternate embodiment of apparatus 100 and a tab mount 212 of wheel 102 is generally indicated at 600. The embodiment 600 differs from the embodiment 500 in that the larger diameter hand rim 104 consists of only the core aluminum tubing structure 400 and does not have a foam coating 402.

In a manner similar to that illustrated in FIG. 5, the embodiment 600 permits the larger diameter rim 400 to move toward the smaller diameter rim 106 as the user grips the two rims, thus providing dampening of both arm and grip shock absorption for the user. An additional advantage of the embodiment 600 is the user is not confined to the smaller diameter hand rim 106 for braking or turning since both hand rims have high heat transfer characteristics.

Since the user grips across both hand rims simultaneously during propulsion and braking, the lateral offset of the two hand rims can be reduced or eliminated to reduce the total width of the wheelchair, thus increasing mobility through narrow passageways. Additionally, the use of the same gripping surface for propulsion and braking may be more intuitive for some users than having to switch grip locations for propulsion and braking.

Figure 7:
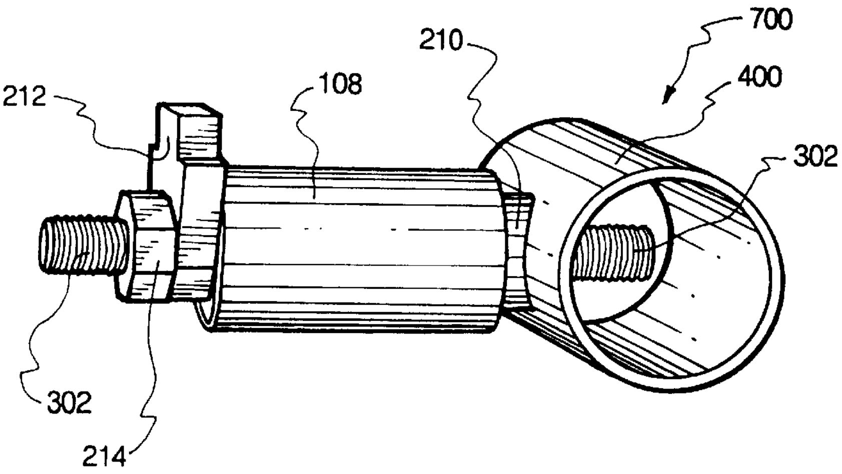
FIG. 7 is a perspective breakaway view of yet another embodiment of a hand rim assembly constructed in accordance with the present invention.

Referring to FIG. 7, a detailed sectional view of the assembly of an alternate embodiment of apparatus 100 and a tab mount 212 of wheel 102 is generally indicated at 700. The embodiment 700 differs from the apparatus 100 in that it provides a single hand rim 400 biasly or resiliently coupled to the wheelchair wheel via the tab mount 212. The foam coating 402 is not applied to the core aluminum tubing structure 400 to allow the hand rim to be used for braking and turning as well as propulsion. One advantage of this embodiment is it allows the same user interface so that it is more intuitive and simple to use. It also allows users to modify their existing rims with the addition of the resilient elastomeric fasteners. An additional advantage of the embodiment 700 is that it reduces the overall width of the wheelchair system, while still providing for at least partial absorption of the shock loads applied by the user. Hence, this embodiment provides users a greater range of mobility during their activities of daily living.

Figure 8:
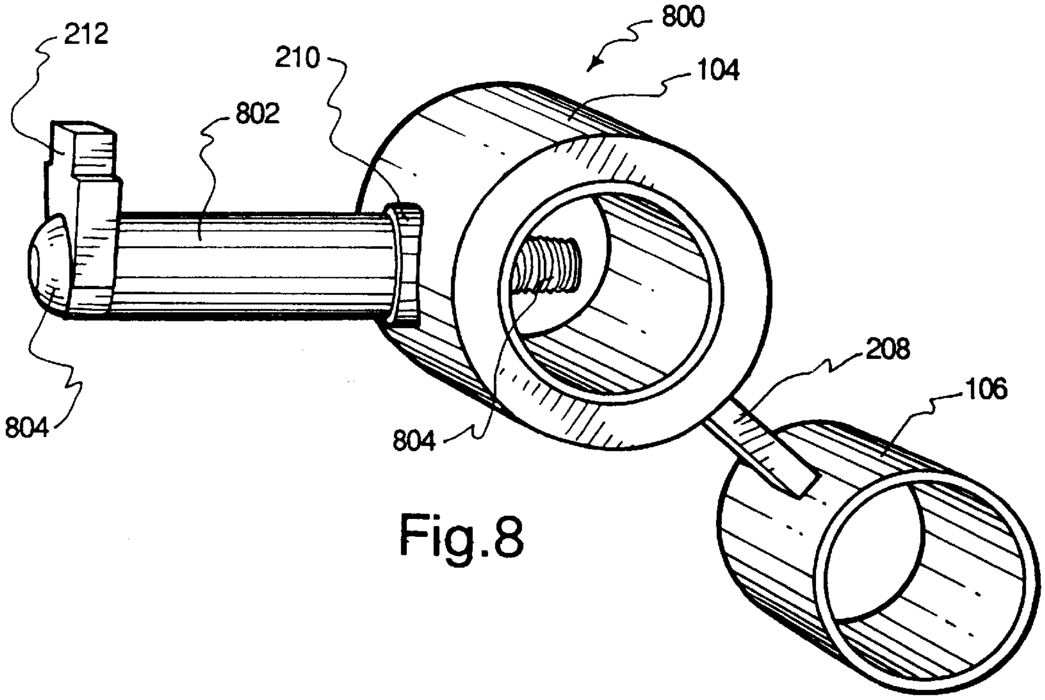
FIG. 8 is a perspective breakaway view of still another embodiment of a hand rim assembly constructed in accordance with the present invention.

Referring to FIG. 8, a detailed sectional view of the assembly of an alternate embodiment of apparatus 100 and a tab mount 212 of wheel 102 is generally indicated at 800. The embodiment 800 differs from the apparatus 100 in that it the elastomeric fastener has been replaced with a standard rigid connector. A machine screw 804 is inserted through a tab mount 212, a rigid tubular spacer 802, and into the threaded insert 210, thus constraining the larger diameter hand rim 104. The advantage of embodiment 800 is a reduction in the amount of shock absorption from apparatus 100. That is, for users who prefer the advantages of the two-rim configuration, but wish to not lose any energy into the resilient elastomeric fasteners described above, the embodiment 800 provides a two-rim configuration with a rigid assembly.

Figure 9:
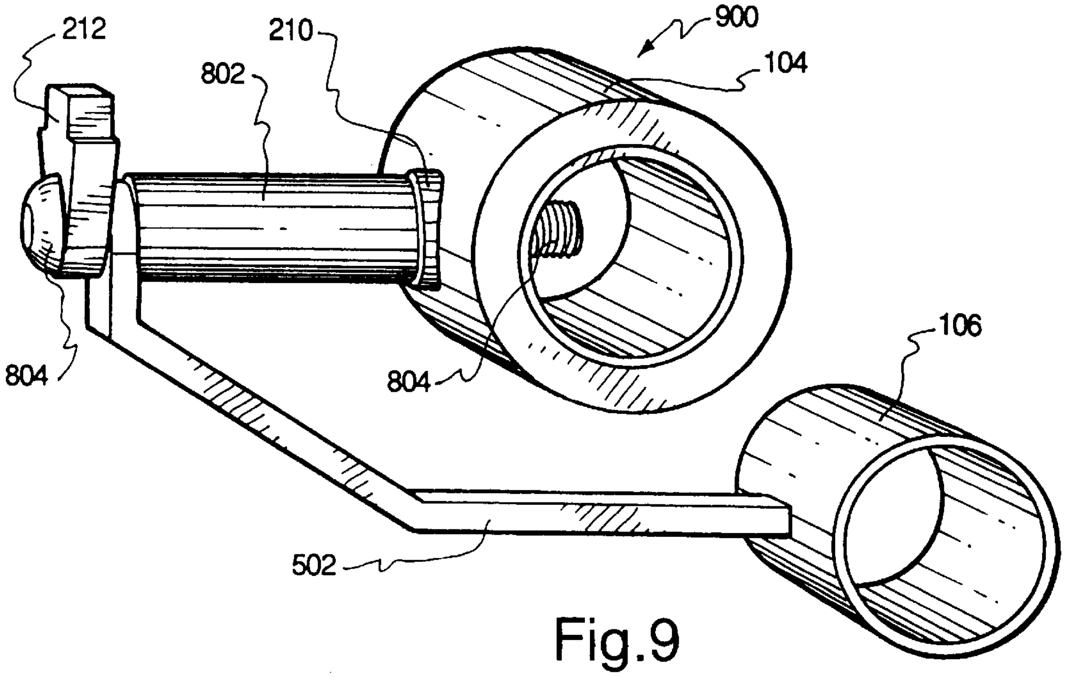
FIG. 9 is a perspective breakaway view of yet still another embodiment of a hand rim assembly constructed in accordance with the present invention.

Referring to FIG. 9, a detailed sectional view of the assembly of an alternate embodiment of apparatus 100 and a tab mount 212 of wheel 102 is generally indicated at 900. The embodiment 900 differs from the embodiment 500 in that it the elastomeric fastener has been replaced with a standard rigid connector. As in embodiment 800, a machine screw 804 is inserted through a tab mount 212, a rigid tubular spacer 802, and into the threaded insert 210, thus constraining the larger diameter hand rim 104. The advantage of embodiment 900 is a reduction in the amount of shock absorption from apparatus 500.

The invention has been described above with reference to a specific embodiment. It will, however, be evident that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A wheel assembly for a wheelchair, comprising:

a wheelchair wheel;

at least one elastomeric resilient connector coupled to the wheel; and a first hand rim coupled to the resilient connector to resiliently couple the first rim to the wheel so that the resilient connector absorbs at least a portion of loads applied to the wheel via the first rim.

2. The wheel assembly for a wheelchair according to claim 1, further comprising a second hand rim coupled to the wheel for providing an alternative or additional gripping location.

3. The wheel assembly for a wheelchair according to claim 1, further comprising a second rim coupled to the first rim for providing an alternative or additional gripping location.

4. The wheel assembly for a wheelchair according to claim 1 wherein the first rim further comprises a substantially circular cross-sectional geometry.

5. The wheel assembly for a wheelchair according to claim 1 wherein the first rim further comprises a substantially circular metal member with a synthetic resinous material coating, further comprising a second rim coupled to the wheel, wherein the second rim has a substantially higher thermal conductivity than the first rim.

6. A wheel assembly for a wheelchair, comprising:

a wheelchair wheel;

at least one resilient connector coupled to the wheel, the connector including:

a first extension connected to the wheel;

a second extension connected to a first rim; and an elastomeric member disposed between the first and second extensions to resiliently couple the wheel to the first rim so that the resilient connector absorbs at least a portion of loads applied to the wheel via the first rim.

7. The wheel assembly for a wheelchair according to claim 1 wherein the first rim is resiliently coupled to the wheel by a plurality of resilient connectors.

8. The wheel assembly for a wheelchair according to claim 1, further comprising a second rim coupled to the wheel, the first and second rims being substantially concentric.

9. The wheel assembly for a wheelchair according to claim 1, further comprising a second rim rigidly coupled to the wheel.

10. The wheel assembly for a wheelchair according to claim 1, further comprising a second rim rigidly coupled to the first rim.

11. The wheel assembly for a wheelchair according to claim 1 where in the first hand rim has a first coefficient of friction, further comprising a second hand rim coupled to the wheel, the second hand rim having a second coefficient of friction, wherein the first and second coefficients of friction are substantially different.

12. The wheel assembly for a wheelchair according to claim 1 wherein the first hand rim has a first coefficient of friction, further comprising a second hand rim coupled to the wheel, the second hand rim having a second coefficient of friction, wherein the first coefficient of friction is substantially higher than the second coefficient of friction.

13. The wheel assembly for a wheelchair according to claim 1, wherein the first hand rim further comprises a vinyl or foam coated exterior surface.

14. The wheel assembly for a wheel chair according to claim 1, further comprising a second hand rim coupled to and laterally offset in spaced relation to the first hand rim for providing an alternative or additional gripping location.

15. A wheel assembly for a wheelchair, comprising:

a wheelchair wheel;

a first hand rim coupled to the wheel for transmitting a user-applied load to the wheel, the first hand rim having a coating to provide a propulsion-enhancing gripping surface, the coating having a first thermal conductivity;

a second hand rim coupled to the wheel and laterally offset in spaced relation with the first hand rim defining a space therebetween, to provide a user with an alternative or additional gripping location for transmitting the user-applied load to the wheel, the second hand rim having a second thermal conductivity, the second thermal conductivity being substantially higher than the first thermal conductivity to improve dissipation of heat generated between a user's hand and the second hand rim during braking.

16. The wheel assembly according to claim 15 wherein the first rim is resiliently coupled to the wheel.

17. The wheel assembly according to claim 15 wherein the first and second rims are rigidly coupled to the wheel.

18. The wheel assembly of claim 15, wherein the coating further comprises a vinyl or foam coating.

19. A method of advancing a wheelchair, comprising the steps:

providing a wheel coupled to the wheelchair;

providing a first rim resiliently coupled to the wheelchair by at least one elastomeric resilient fastener;

applying a load on the first rim; and absorbing at least a portion of the load with the resilient fastener.

20. The method of advancing a wheelchair according to claim 19, further comprising the step of providing a second rim coupled to the wheel for providing a user with an expanded or alternative gripping location.

* * * * *